US005192503A

United States Patent [19]

McGrath et al.

[11] Patent Number: 5,192,503

[45] Date of Patent: Mar. 9, 1993

[54] PROBE CLIP IN SITU ASSAY APPARATUS

[76] Inventors: Charles M. McGrath, 6669 Beach, Troy, Mich. 48098; Jennipher Grudzien, 440 Brocker Rd., Metamora, Mich. 48455

[21] Appl. No.: 528,067

[22] Filed: May 23, 1990

[51] Int. Cl.[5] ...................... G01N 21/01; G01N 21/78; B65D 49/02; B65D 49/08

[52] U.S. Cl. ........................................ 422/57; 422/58; 422/61; 422/99; 422/102; 435/301; 356/244; 356/246; 359/398

[58] Field of Search ........................... 436/63, 809, 46; 435/299-301; 422/57, 58, 99, 61, 50, 102; 350/536; 356/244, 246; 359/398

[56] References Cited

U.S. PATENT DOCUMENTS

| | | | |
|---|---|---|---|
| 2,351,282 | 6/1944 | Oliver, Jr. | 350/536 |
| 2,561,339 | 7/1951 | Chediak | 23/253 |
| 3,141,547 | 7/1964 | Newby | 206/1 |
| 3,234,107 | 2/1966 | Kaufman et al. | 195/139 |
| 3,556,633 | 1/1971 | Mutschmann et al. | 350/536 |
| 3,574,064 | 4/1971 | Binnings et al. | 435/293 |
| 3,620,596 | 11/1971 | Binnings | 350/536 |
| 3,691,017 | 9/1972 | Brown et al. | 422/61 |
| 3,725,004 | 4/1973 | Johnson et al. | 422/102 |
| 3,726,767 | 4/1973 | White | 195/127 |
| 3,745,091 | 7/1973 | McCormick | 195/139 |
| 3,883,398 | 5/1975 | Ono | 195/127 |
| 3,888,741 | 6/1975 | Freake et al. | 195/139 |
| 3,928,142 | 12/1975 | Smith | 435/299 |
| 4,181,501 | 1/1980 | Keese et al. | 422/57 |
| 4,204,045 | 5/1980 | Kjellander et al. | 435/301 |
| 4,260,687 | 4/1981 | Jacobson et al. | 435/301 |
| 4,324,859 | 4/1982 | Saxholm | 435/33 |
| 4,385,115 | 5/1983 | de Zabala et al. | 435/33 |
| 4,450,231 | 5/1984 | Ozkan | 435/7 |
| 4,456,581 | 6/1984 | Edelmann et al. | 422/102 |
| 4,457,894 | 7/1984 | Clark et al. | 435/300 |
| 4,608,231 | 8/1986 | Witty et al. | 422/61 |
| 4,714,590 | 12/1987 | Guigan | 422/102 |
| 4,753,531 | 6/1988 | Hiratsuka et al. | 356/246 |
| 4,761,381 | 8/1988 | Blatt et al. | 356/246 |
| 4,762,794 | 8/1988 | Nees | 435/284 |
| 4,777,020 | 10/1988 | Brigati | 422/99 |
| 4,788,154 | 11/1988 | Guigan | 422/102 |
| 4,803,154 | 2/1989 | Uo et al. | 435/7 |
| 4,822,742 | 4/1989 | Challberg et al. | 435/310 |
| 4,829,010 | 5/1989 | Chang | 422/58 |
| 4,834,946 | 5/1989 | Levin | 422/101 |
| 4,853,188 | 8/1989 | Toya | 436/45 |
| 4,874,582 | 10/1989 | Gordon et al. | 422/102 |
| 4,950,455 | 10/1990 | Smith | 422/99 |
| 4,963,498 | 10/1990 | Hillman et al. | 422/102 |
| 4,978,503 | 12/1990 | Shanks et al. | 422/58 |
| 4,990,075 | 2/1991 | Wogoman | 422/102 |
| 5,002,736 | 3/1991 | Babbitt et al. | 422/100 |

OTHER PUBLICATIONS

"Performing Nucleic Acid Reactions Using Predispensed Lyophilized Reaction Mixtures," Biotechniques, vol. 7, No. 10 (1989) pp. 1110-1115.

*Primary Examiner*—James C. Housel
*Assistant Examiner*—Jan M. Ludlow
*Attorney, Agent, or Firm*—Basile and Hanlon

[57] ABSTRACT

A probe clip for in situ assay of tissue sections in the form of a plate having a first seal member mounted thereon and forming an interior cavity on the plate. In one embodiment, a second seal member is mounted interiorly of the first seal member and divides the interior cavity into first and second fluid communicatable surfaces, with a probe dryingly attached to the plate and disposed on the second mixing surface. The plate is joined to a slide carrying a tissue section and a reactant fluid such to form fluid communicatable reaction and mixing chambers. Successive rotations of the joined plate and slide causes the reactant fluid to initially flow to the mixing chamber and release the probe, before the probe flows to the reaction chamber for reaction with the tissue section. In another embodiment, a time-release material covers the probe mounted on a plate having a single chamber. The reactant fluid hydrolyzes the time-release material to release the probe for reaction with the tissue. The cassette carrying one or more plates is slidingly insertable into a semi-closed housing containing one or more tissue-carrying slides. Clamps urge the probe clip cassette and the individual plates into engagement with the slides to form the sealed chambers therebetween. Inlet and outlet wash ports communicate with the slides to wash the slides after the plates have been removed from the housing.

7 Claims, 5 Drawing Sheets

PROBE CLIP IN SITU ASSAY APPARATUS

BACKGROUND OF THE INVENTION

Field of the Invention

The invention relates, in general, to apparatus and methods for performing assay on biological tissue.

In situ assays are performed on tissues by using reagents to detect macromolecules directly in cells. Standard in situ assays include in situ hybridization (ISH) and immunocytochemistry (IC). Such assays utilize suitable probe reagents, including nucleic acids and/or antibodies, to bind with and mark message RNA or protein in cells to detect the presence, location and quantity of such molecules. Such methods, particularly those that are also capable of detecting low abundance RNA in relatively small cell samples, are of great importance in clinical oncology for early detection, diagnosis, prognosis and treatment of cancers.

In a typical in situ assay, a specific amount of a reagent is added to a tissue section mounted on a slide. The reagent is allowed to bind to the tissue for a predetermined amount of time, i.e., one to several hours, so as to mark specifically bound message RNA or protein in the tissue section. The tissue section is then washed to remove non-specifically bound reagent from the tissue and is further processed to prepare tissue for analysis via microscopic examination, etc.

In situ methods currently employed use an "open-bench" technique in which the reagent is added manually to a tissue section mounted on a slide and then each slide is individually washed. Long incubation times required for ISH reactions usually require that reactions are carried out under a thin film or cover sheet placed over the tissue section on the slide which is then sealed with wax or oil to prevent drying high temperature incubation. These methods are clearly very labor intensive and time consuming and prone to ad hoc variations which reflect high cost and poor reliability.

Recently, more automated assay apparatus and methods have been devised to address and overcome certain of these problems. Such automated apparatus utilize a slide or cover plate that fits on a tissue carrying slide with a narrow (approximately 0.2 mm) clearance between the two slides. Fluid is introduced to the tissue section by capillary movement between the two opposed slides and surface adhesion holds the liquid reactant in place between the two slides to create an open reaction chamber. However, while such devices are a major advance in performing in situ assays, they have significant defects which limits their reliable use. These automated units use capillary action and surface adhesion which limits their versatility to certain reactions and create sensitivity problems. For example, such automated apparatus cannot be used at all for ISH assays in which a strong ionic detergent (i.e., SDS) is a preferred reagent and weak non-ionic surfactants (i.e., triton) have to be present at high (approximately 3.0 percent levels for efficient operation. Viscous reagents which give versatility to ISH assays are also problematic for these capillarity-based automated devices.

Further, the close tolerance between the two opposed slides in each unit creates an adhesive fluid surface which limits reactant mixing during reactions since the tissue occupies only a small fraction of the slide area and the reactants are spread over a larger slide area and, also, makes washing of unused reactant very inefficient. Evaporation is also a problem with the open chambers employed in these devices. Thus, these automated in situ assay devices are reliable for only a few applications and are primarily used for abundant targets where the signal to noise ratio is not a critical factor.

Thus, it would be desirable to provide an in situ apparatus and method which still utilizes a thin chamber for use of a small volume of reagents, but in which reactant fluid position is controlled by gravity on a tissue carrying slide rather than by capillary action. It would also be desirable to provide an in situ assay apparatus in which the reaction chamber has sufficient vertical space between a cover slide and the tissue carrying slide to reduce friction for complete reactant mixing. It would also be desirable to provide an in situ assay apparatus and method which makes washing of the hybridized tissue more thorough than previously devised in situ assay techniques. It would also be desirable to provide an in situ apparatus and method in which no evaporation of the reactant can occur and only a small volume of the reactant is used to cover only the tissue on the slide. It would also be desirable to provide an in situ apparatus and method which combines blocking and probe-incubation steps into a single unit. It would also be desirable to provide an in situ apparatus and method in which predetermined amounts of pre-prepared reactant can be mounted in place on the slides in advance of the in situ assay.

SUMMARY OF THE INVENTION

The present invention is a probe reaction chamber and a probe reaction chamber apparatus and method for in situ assay of a tissue section mounted on a slide.

In one embodiment, the probe reaction chamber comprises a plate (i.e., probe clip) which is releasably and sealably joinable to a tissue-carrying slide. A seal member is mounted on the plate and has a closed periphery defining an interior cavity on the plate which is the reaction chamber. Means are provided for releasing a prove initially disposed on the plate with the tissue on the slide a predetermined amount of time after the reactant fluid initially added to the tissue section on the slide contacts the plate. In one embodiment, a time-release coating of a suitable material; e.g., gelatin, is applied over the probe mounted on the plate so as to be hydrolyzed in the reactant fluid applied to the tissue on the slide a predetermined amount of time after the plate and slide have been sealingly joined together. This allows time for blocking of the tissue with the reactants before the reaction of the probe with the tissue. In another embodiment, the probe reaction chamber is formed of a plate having a general rectangular shape corresponding to the shape of a conventional tissue-carrying slide. A first seal member is mounted on the plate and has a closed periphery defining an interior cavity on the plate. One end of the plate is raised to form a platform on which the first seal member is mounted. Dividing means is mounted on the raised portion of the plate in the interior cavity bounded by the first seal member. The dividing means is preferably in the form of a second seal member having first and second ends. At least one and preferably both of the first and second ends of the second seal member are spaced from adjacent portions of the first seal member to define fluid flow channels therebetween which form mixing and reaction surfaces in the interior cavity on the plate.

The plate is joined to a tissue-carrying slide such that the first and second seal members sealingly contact the slide and form fluid flow communicatable mixing and reaction chambers therebetween.

A probe reagent is releasably mounted on the mixing surface of the plate. The tissue section is mounted on the slide and is disposed in the first reaction chamber formed by the joined plate and slide. A fluid reactant, such as a blocking reactant, initially applied to the tissue section will flow to and mix with the probe causing release of the probe from the plate when the joined plate and slide are rotated from a substantially horizontal position. The mixed probe and fluid reagent then flow back to the reaction chamber to react with the tissue section on the slide by further rotation of the joined plate and slide back to a substantially horizontal position. Hybridization of the tissue section by the probe can then take place to mark message RNA, the example, in the tissue section.

For performing assays of multiple tissue sections, a housing having a front wall with an aperture formed therein, a back wall, top and bottom walls and opposed side walls slidably receives a probe clip cassette containing a plurality of individual plates having probes attached thereto, as described in the above two embodiments. A plurality of slide-receiving receptacles are formed in the housing and extend inward from the aperture in the front wall for receiving individual tissue-carrying slides. The probe clip cassette is slidingly inserted into the aperture in the front wall of the housing with the probe-carrying plates opposingly facing the slides.

Tensioning means are mounted in the housing for normally biasing the probe clip cassette and the individual plates to a first position in which the plates are spaced from the respectively opposed slides. Threaded fasteners extend through the housing to engage a tensioning plate to overcome the biasing force of a biasing means or spring(s) mounted in the housing and urge the probe clip cassette and the plates into engagement with the slides to form sealed chamber or chambers between each pair of plates and slides. In the embodiment, where separate mixing and reaction chambers are formed between each plate and slide, the entire housing is rotated from the horizontal to a substantially vertical position and, back to the horizontal to cause the flow and mixing of the reagent, probe and tissue section. It will be noted that no horizontal/vertical rotations are required for the embodiment in which the probe is initially covered by a time-release material.

The method for performing an assay on a tissue section according to the present invention comprises the steps of initially applying a tissue section to a planar slide. Then, a fluid reagent, such as a blocking agent, is added to the tissue section in sufficient quantity to cover the tissue section. A probe reactant is attached by suitable means, such as by freeze drying, to first mixing surface on the planar plate. The plate is then sealingly attached to the slide via the seal members mounted on the plate. In the two chamber embodiment, the probe is normally disposed in a first mixing chamber formed between the joined plate and slide; while the tissue section is normally disposed in the spaced, fluid flow communicatable section chamber formed between the joined plate and slide.

The joined plate and slide are then rotated from the horizontal to a substantially vertical orientation to cause the fluid reagent in the reaction chamber to flow to the mixing chamber and react with and release the probe from the plate. Further rotation of the joined plate and slide back to a horizontal orientation causes the fluid reagent and the probe to flow to the reaction chamber to mix the probe with and hybridize the tissue section.

The plates and/or the probe clip cassette carrying a plurality of plates may be released from engagement with the slides via the tensioning means and removed from the housing. Washing fluid may then be applied to the slides to wash the tissue sections on the slides of excess amounts of fluid reagent and probe reactant.

In the single chamber embodiment in which the attached probe is initially coated with a time-release material, the plate is merely sealingly attached to the slide after the reactant fluid has been applied to the tissue section on the slide. A predetermined time after joining together, the reactant fluid will hydrolyze such that the reactant fluid will contact the probe and release the probe from the plate for reaction with the tissue section. This method does not require any rotation of the joined plate and slide as described above in the other embodiment of the present invention. Release of the plate from the slide and subsequent washing can take place after the probe has hybridized the tissue section in the manner described above.

The probe clip and in situ assay apparatus of the present invention provides many advantages over previously devised methods for performing in situ assays of tissue sections. The apparatus provides a standardized in situ assay technique which can be performed on one or more tissue sections simultaneously thereby improving the efficiency of in situ assays, as well as obtaining reliable results.

The thin closed chamber formed between the joined plate and slide enables small volumes of reagents to be utilized which standardizes and maximizes contact between the reagents, the probe and the tissue. Fluid position control in the reaction and mixing chambers formed by the joined plate and slide is controlled by gravity and not inefficient capillary action as in previously devised assay reaction chambers.

Both the time-release embodiment and the two separate, but fluid flow communicatable chamber embodiment combine the blocking (pre-hybridization) and hybridization steps in a single unit at one time.

The apparatus and method of the present invention also enables the probe to be prepared in advance and attached to individual plates. Thus, the probe can be pre-measured and dispersed in accurate amounts. This provides effective calibration and standardization which results in more accurate testing results. Further, less amounts of expensive probe are used thereby minimizing waste. The apparatus of the present invention is also safer for radioactive probe techniques since there is no exposure to dangerous material in concentration form. Further, there is no need for expensive containment or handling equipment.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
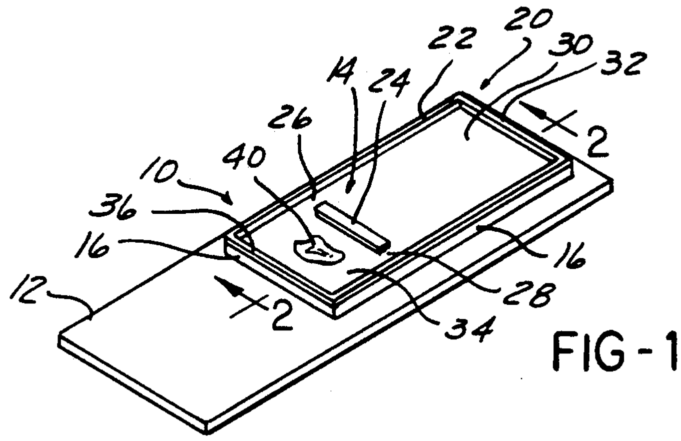
FIG. 1 is a perspective view of one embodiment of a probe clip constructed in accordance with the teachings of the present invention.

Throughout the following description and drawing, an identical reference number is used to refer to the same component shown in multiple figures of the drawing.

As shown in FIGS. 1, 2, 3 and 4, the present invention comprises a probe clip 10 which is used to carry reactants utilized in situ assay of tissue sections, such as in situ hybridization (ISH) and immunocytochemistry (IC). The probe clip 10 is in the form of a thin, planar, slide having, by way of example only, a generally rectangular shape. In the example shown in FIG. 1, the slide 12 has dimensions of approximately 25 mm by 75 mm. The slide or base plate 12 may be formed of any suitable material, such as a clear, siliconized, polycarbonate plastic.

Figure 2:
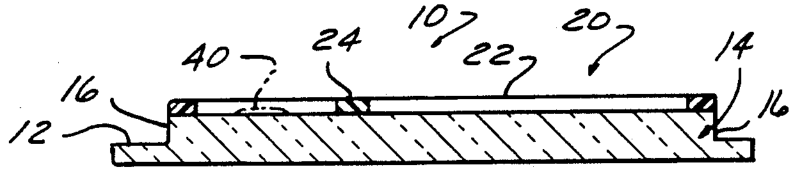
FIG. 2 is a cross-sectional view generally taken along line 2—2 in FIG. 1.

A raised surface or platform 14 is formed or mounted on the upper surface of the base plate 12 and is positioned adjacent one end of the base plate 12 as shown in FIGS. 1 and 2. The raised surface 14 is preferably formed as a single, integral piece with the base plate 12 of a molded or machined plastic. Alternatively, the raised surface 14 may comprise a separate material layer which is joined to the upper surface of the base plate 12 by means of a suitable adhesive. As shown in FIGS. 1 and 2, the side walls 16 on all four sides of the raised surface 14 are spaced inward from the adjacent side edge of the base plate 12 such that the peripheral edges of the base plate 12 extend outward beyond the side walls 16 of the raised platform 14.

A seal means, denoted in general by reference number 20, is mounted on the raised surface 14. The seal means 20 is preferably in the form of a thin bead of a suitable seal material, such as a hard, flexible silicone gasket, which is injected molded, extruded or machined to the desired shape. The seal means include a first seal member 22 which has a height of approximately 400 microns and is positioned on the peripheral edge of the raised surface 14 so as to be disposed along the edge of all four sides of the raised surface 14. The seal member 22 has a closed periphery creating an internal cavity on the raised surface 14.

Means 40 are provided for releasing a probe previously attached to the plate 12 from the plate 12 a predetermined amount of time after a reactant fluid, initially disposed on the tissue section on a slide, has been in contact with the tissue section. In one embodiment described later, the releasing means may take the form of a suitable material coating, such as gelatin, applied over and covering the probe 40 on the plate which is dissolved or hydrolyzed by the reactant fluid a predetermined amount of time after the initial contact therebetween. This allows contact between the probe and the reactant fluid and releases the probe from the plate for reaction with the tissue, as described in greater detail below.

Alternately, in the embodiment shown in FIGS. 1–4, the releasing means may be provided by simple mechanical structure and manipulation of the probe clip and slide. In this embodiment, divider means in the form of a second seal number 24 is mounted on the raised surface 14 interiorly of the first seal member 22 as shown in FIG. 1. The second seal member 24 is formed of the same material and has the same height as the first seal member 22. The length of the second seal member 24 is selected so as to form fluid flow communication channels 26 and 28 between the first and second ends of the second seal member 24 and the adjacent portions of the first seal member 22. At least one channel 26 or 28 is required; although two channels 26 and 28 are preferred for purposes of the present invention. The first and second seal members 22 and 24 are mounted on the raised surface 14 by any suitable means, such as an adhesive.

The first and second seal members 22 and 24 form a reaction chamber surface 30 between the second seal member 24, the side edges of the first seal member 22 and a first end edge 32 of the first seal member 22. A mixing chamber surface 34 is formed on the raised surface 14 between the second seal member 24, portions of the side walls of the first seal member 22 and a second end wall 36 of the first seal member 22.

A probe denoted by reference number 40 is releasably applied to the raised surface 14 on the mixing chamber surface 34 of the plate shown in FIG. 1 by suitable means, such as freeze-drying, etc. The probe 40 comprises any suitable antibody or nucleic acid used for reacting with tissue sections to mark and bind with message RNA or protein in a tissue section or cell to identify and quantify the macromolecule in the tissue section for subsequent analysis. By way of example, the probe 40 may be freeze-dried on the mixing chamber surface 34 in a 10 ul drop which can be efficiently rewetted and released from the surface 34 so as to mix with a reactant fluid or blocking buffer, as described hereafter. Thus, the probe 40 is placed on the probe clip 10 in a dry, rewettable state. This allows the probe clip 10 to be prepared in advance for interchangeable use with tissue sections in performing in situ assays of such tissue sections.

Figure 6:
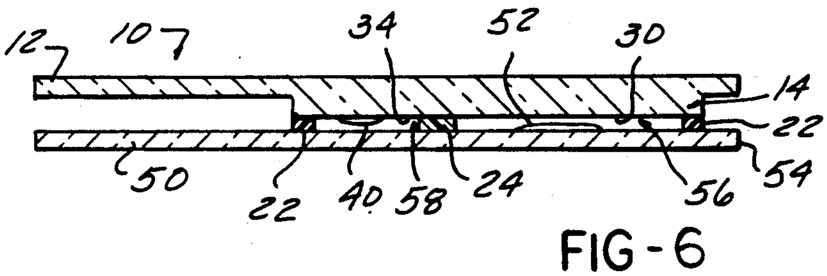
FIG. 6 is a partial, longitudinal, cross sectional view taken through FIG. 5 showing the reaction and mixing chambers formed between the probe clip and the tissue slide in the joined position.

As shown in FIG. 6 and in FIGS. 8A–8F, the probe clip 10 is joined, such as by joining means described hereafter, to a similarly shaped slide 50. A small tissue section or grouping of cells 52 to be assayed is mounted on the slide 50 by any suitable means, such as the transfer method disclosed in co-pending U.S. application Ser. No. 07/383,446, filed on Jul. 24, 1989, in the name of Charles M. McGrath, the contents of which are herein incorporated by reference.

As shown in FIG. 6, the tissue section 52 is mounted on the slide 50 adjacent a first end 54 of the slide 50. When the slide 50 is joined to the probe clip 10, the tissue section 52 faces the reaction chamber surface 30 formed on the probe clip 10. The probe 40 is mounted on the mixing chamber surface 34 of the probe clip 10 and is spaced and separated from the tissue section 52 by the second seal member 24. The joined probe clip 10 and slide 50, as shown in FIG. 6, form a reaction chamber 56 and a mixing chamber 58 therebetween. The reaction chamber 56 is formed about the tissue section 52 on the slide 50 and is surrounded by the second seal member 24 and portions of the first seal member 22. The mixing chamber 58 is spaced from the reaction chamber 56 and is surrounded by the second seal member 24 and other portions of the first seal member 22. However, due to the channels 26 and 28 formed between the ends of the second seal member 24 and the adjacent portions of the side walls of the first seal member 22, fluid disposed in either of the mixing chamber 58 or the reaction chamber 56 may flow easily therebetween, as described hereafter.

In using the in situ assay apparatus of the present invention, a suitable reactant or blocking fluid solution, such as Tris buffer containing 50% formamide and/or 0.1% detergent, or 10% dextran sulfate, etc., is placed in predetermined quantities on the tissue section 52 on the slide 50. The blocking solution may be disposed directly on the tissue section 52 in small quantities, such as 50 to 200 ul, or anywhere on the slide 50 surrounding the tissue section 52 so as to completely fill the reaction chamber 56 when the slide 50 is joined to the probe clip 10. Due to the small quantity of solution employed and the spacing between the opposed surfaces of the slide 50 and the probe clip 10, surface tension retains the blocking fluid in place over the tissue section 52 when the joined probe clip 10 and slide 50 are oriented in the horizontal position shown in FIG. 6.

Figure 8C:
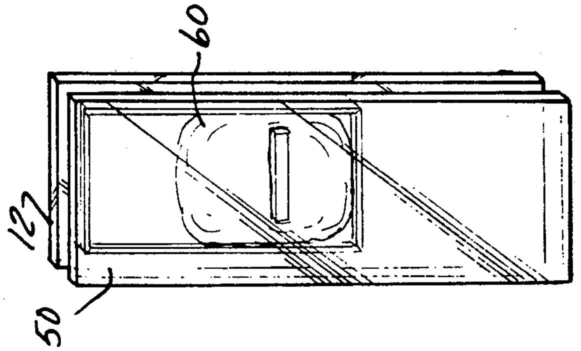
FIGS. 8A, 8B, 8C, 8D, 8E and 8F are sequential, perspective views, with the probe clip and slide inverted from the normal mounting position, showing the manipulation of the joined probe clip and tissue slide during the steps of the in situ assay method of the present invention.
Figure 8F:
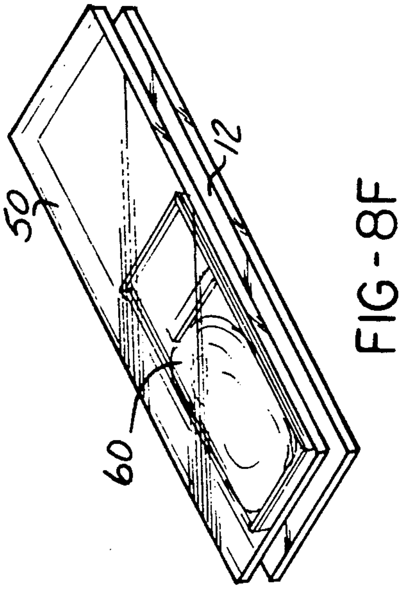
Figure 8B:
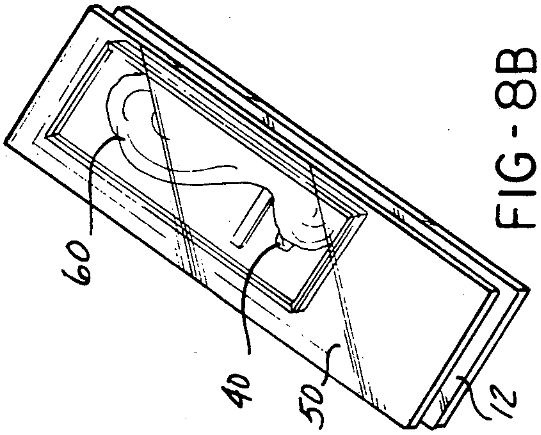
Figure 8E:
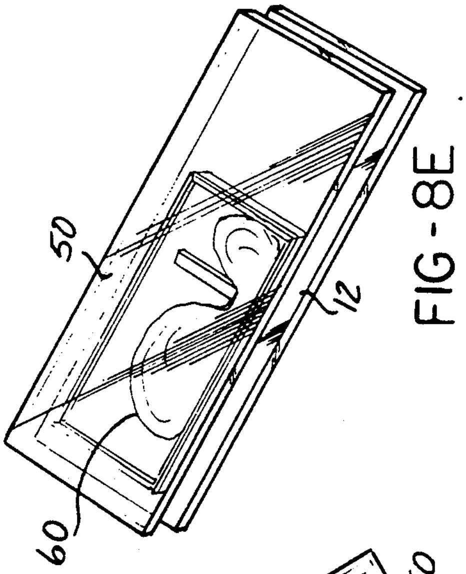
Figure 8A:
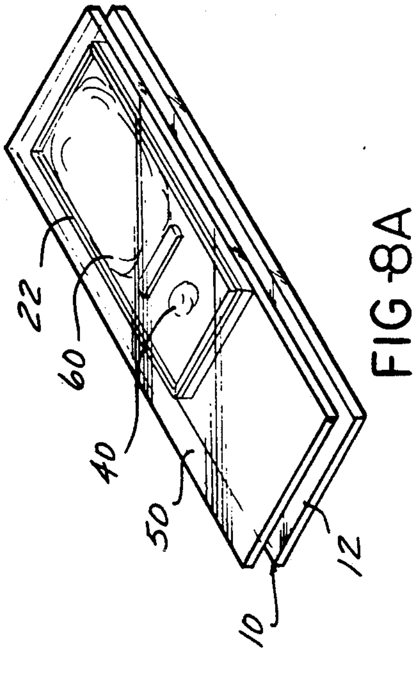

In utilizing the probe clip 10 of the present invention to perform an in situ assay, after a blocking solution has been added to the tissue section 52 on the slide 50, the probe clip 10 carrying a probe 40 is joined to the slide 50 in the orientation shown in FIG. 6 and FIG. 8A. the seal members 22 and 24 form the reaction chamber 56 and the mixing chamber 58 between the opposed surfaces of the probe clip 10 and the slide 50.

After the blocking solution has contacted and permeated the tissue section 52 for a predetermined amount of time, such as one to two hours with certain reactants, the time release coating is hydrolyzed so that the blocking solution contracts and dissolves the probe. In another embodiment, the joined probe clip 10 and slide 50 are rotated to a substantially vertical position as shown in FIGS. 8B and 8C. This causes the reactant fluid contained in the reaction chamber 56 to flow to the mixing chamber 58 and wet the probe 40 disposed on the probe clip 10. This wetting causes the probe 40 to separate from the probe clip 10 and mix with the blocking fluid.

Figure 8D:
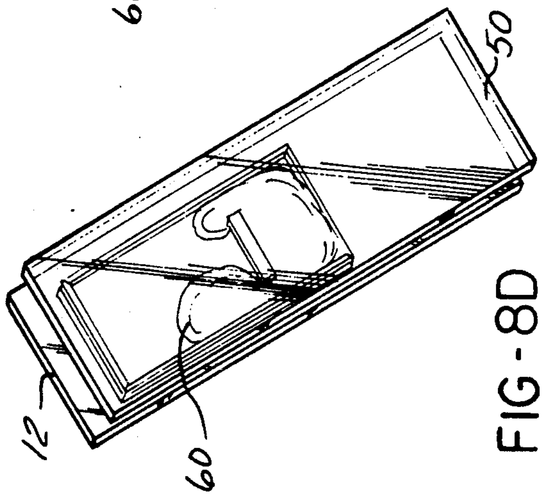

After the probe 40 has been sufficiently wetted and released from the probe clip 10, the joined probe clip 10 and slide 50 are then rotated back to a substantially horizontal position as shown in FIGS. 8D, 8E and 8F to cause the mixed fluid and probe 60 and 40 to again flow back to the reaction chamber 56. This brings the probe 40 into contact with the tissue section 52 wherein the probe binds and marks with the message RNA in the tissue section 52.

After a sufficient reaction time, as determined by the particular blocking solution, probe and tissue, the probe clip 10 is separated from the slide 50 and discarded or prepared for subsequent reuse. The slide 50 is then washed by means of suitable washing fluid, as described hereafter, to remove all traces of the unbound and non-specifically bound probe 40 from the tissue section 52. Subsequent colorization techniques, etc., may then be employed to enhance the marked macromolecule in the tissue section 50 for microscopic analysis or other evaluation techniques.

Figure 3:
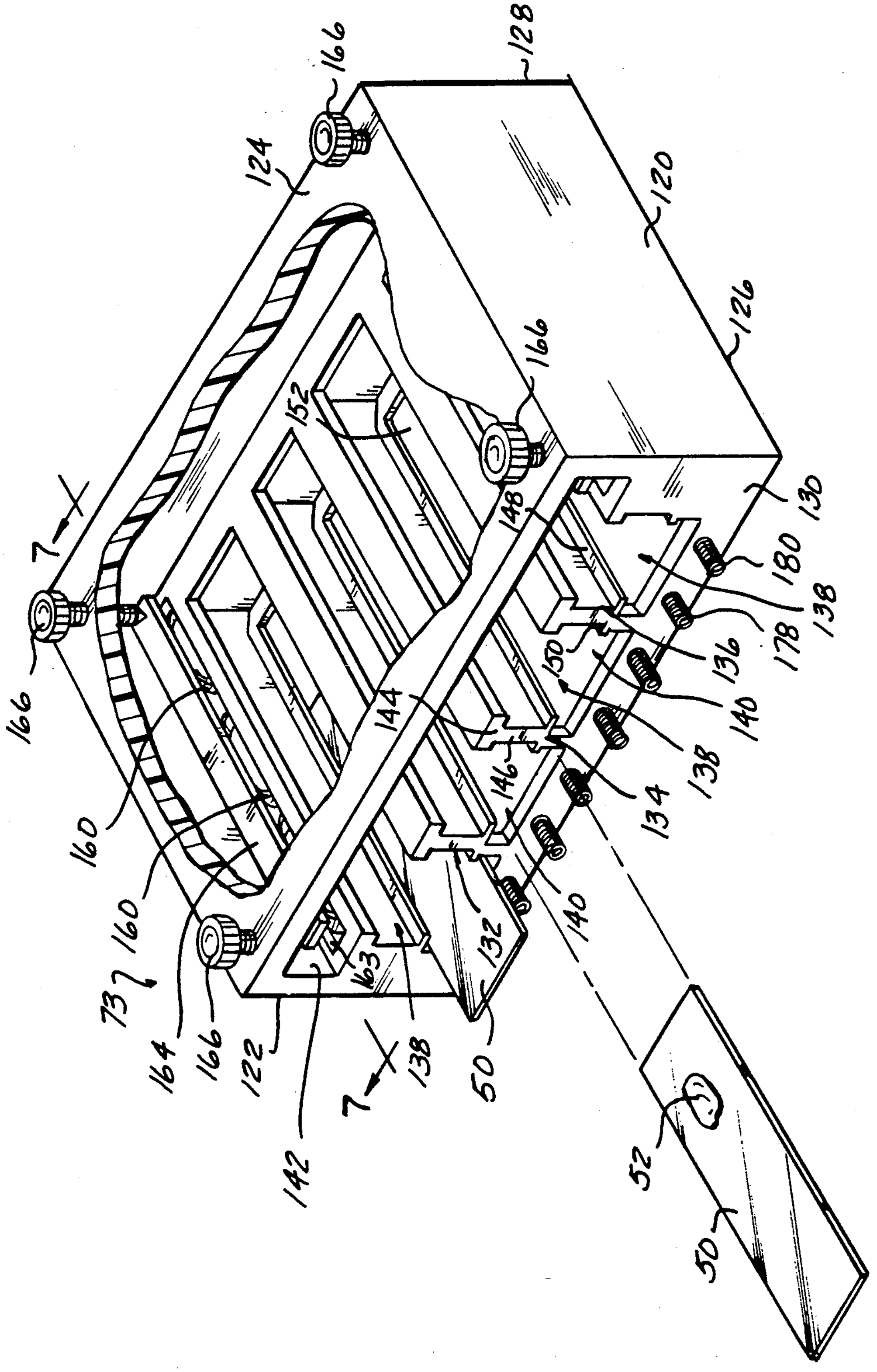
FIG. 3 is a perspective, exploded view of an in situ apparatus utilizing the probe clip shown in FIG. 1.
Figure 4:
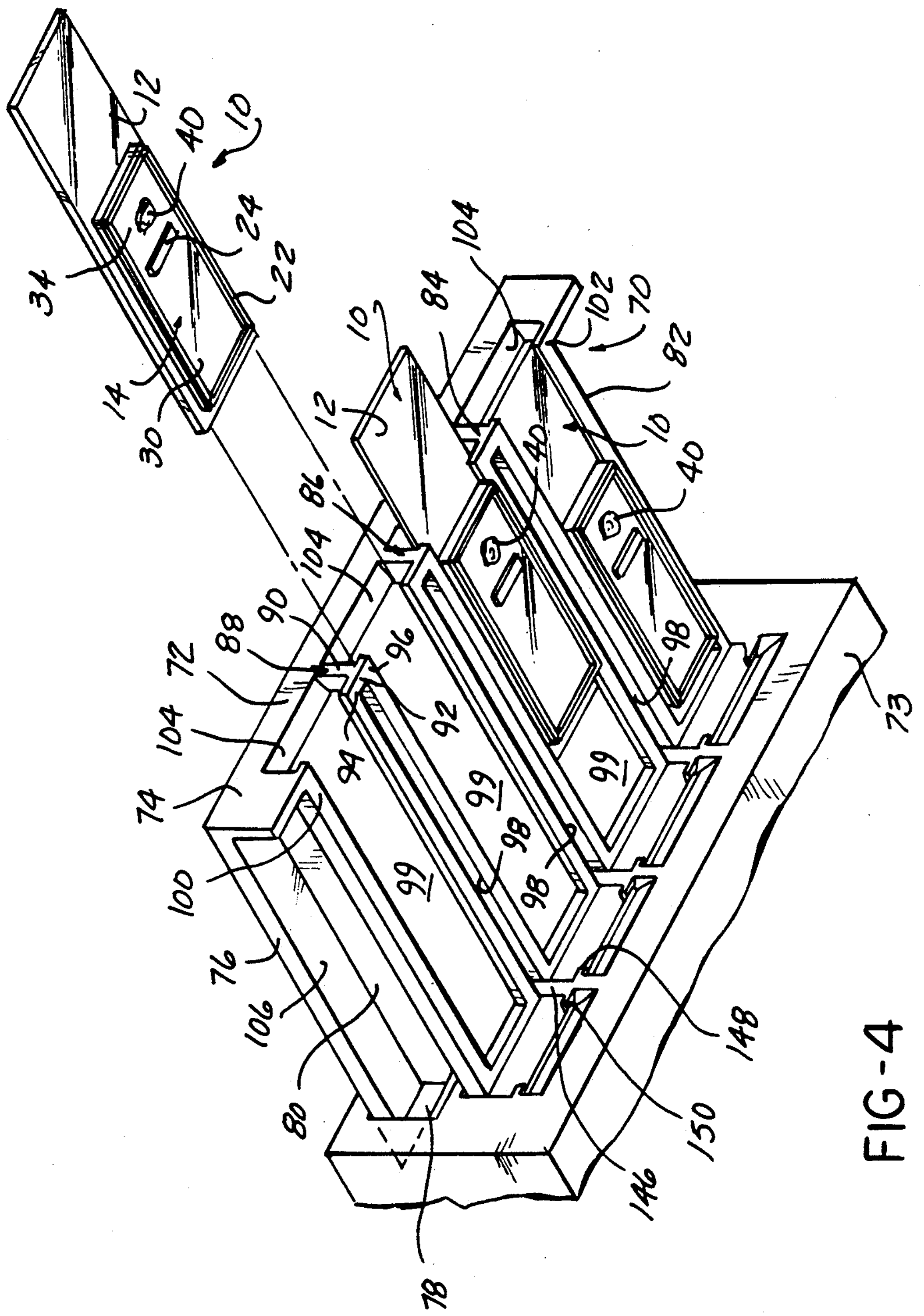
FIG. 4 is a partial, perspective view showing the mounting of the probe clip in a probe clip cassette insertable into the housing shown in FIG. 3.

FIGS. 3 and 4 depict a probe clip cassette 70 which is removably mountable in a casing or housing 73 for performing in situ assays involving one or more combined sets of probe clips 10 and slides 50.

The probe clip cassette 70 will be described first and is illustrated, by way of example only, as carrying four separate, side-by-side positioned probe clips 10. The number of probe clips 10 and the overall size of the probe clip cassette 70 may be varied as necessary for more or less probe clips 10 depending upon the particular in situ assay application or testing procedure.

The probe clip cassette 70, shown in detail in FIG. 4, may be formed of any suitable material, such as a molded or machined plastic. Preferably, polycarbonate plastic is employed to form the cassette 70.

The probe clip cassette 70 is formed with a planar base 72. An upstanding front wall 74 is formed on one side of the base 72 and extends perpendicularly from the base 72. The base 72 also includes opposed end walls 76 which extend between the front wall 74 and a back wall of edge 78.

Side walls 80 and 82 are formed on the base 72 and extend perpendicularly from the base 72. The side walls 80 and 82 are spaced on opposite ends of the base 72 adjacent the end wall 75 of the base 72 and extend perpendicularly from the front wall 74.

A plurality of divider walls 84, 86 and 88 are formed on the base 72 and extend perpendicularly from the base 72. The divider walls 84, 86 and 88 are equally spaced from each other and from the spaced end walls 80 and 82 as shown in FIG. 4. Each of the divider walls 84, 86 and 88 is identically constructed and has a generally T-shaped configuration formed of an upstanding leg 90 which extends perpendicularly from the base 72. A cross flange or leg 92 is joined to the upstanding leg 90 on each divider wall 84, 86 and 88 and is positioned with one outwardly extending portion 94 extending a further distance away from the vertical leg 90 than the opposed portion 96. A slot 98 is formed in each of the divider walls 84, 86 and 88 and extends between a position spaced from the front wall 74 and the back wall or edge 78 on the base 72. The slots 98 allow for the insertion of the probe clip cassette 70 into the case 73 between dividers formed in the case 73 as described hereafter.

The spacing between each of the divider walls 84, 86 and 88 and the end walls 80 and 82 is selected to slidably and snugly receive one probe clip 10 therebetween, as shown in FIG. 4. The exposed surface 99 of the base 72 and between each of the divider walls 84, 86 and 88, and the end walls 80 and 82, and between the divider walls 88 and 84, respectively, forms a base for receiving and supporting a probe clip 10 thereon. The portions 94 and 96 on the cross flange or leg 92 of each divider wall 84, 86 and 88, as well as the corresponding inwardly extending legs 100 and 102 on the side walls 80 and 82 are spaced from the exposed surface 99 on the base 72 a distance sufficient to receive the base plate 12 of each probe clip 10. Since the raised surface 14 on each probe clip 10 extends upward from the base plate 12 and is spaced inwardly from the peripheral edges of the base plate 12, the raised surface 14 extends through and slides between opposed pairs of the facing surfaces of the leg portions 94 and 96 of the divider walls 84, 86 and 88 and the legs 100 and 102 of side walls 80 and 82, respectively. In this configuration, the seal means 20 on each probe clip 10 is spaced above the upper surface of each cross leg 92 on the divider walls 84, 86 and 88 and the upper surface of the legs 100 and 102 of the end walls 80 and 82, respectively.

An inclined or beveled surface 104 is formed at the front edge of each exposed surface 99 on the base 72 and angles away from the bottom surface 99 to act as a guide for each probe clip 10 to guide and securely position the probe clip 10 in each spaced slot in the base 72 of the probe clip cassette 70.

As shown in FIG. 4, each side of the base plate 72 extends outward from the side walls 80 and 82 to the respective end walls 76. This forms a surface 106 on each end of the base plate 70 which acts as a tensioning plate support rail, the purpose of which will be described hereafter.

It should be noted that the orientation of the probe clip cassette 70 in FIG. 4 with respect to the case 73 is the normal use position for insertion into the case 73. It will be noted that the individual probe clips 10 may be mounted in the probe clip cassette 70 in the orientation shown in FIG. 4 or they may be mounted into the probe clip cassette 70 when the probe clip cassette 70 is inverted or upside down from the orientation shown in FIG. 4.

The case or housing 73, shown in FIGS. 3 and 4, has, by way of example only, a generally rectangular, cubical form. The case 73 is formed of any suitable material, such as a clear polycarbonate, which can withstand temperatures ranging between 4° C. to 90° C. The material must also be resistant to various reagents, such as formamide, low M.W. alcohols, detergents, etc.

The case 73 has closed sides 120 and 122, a top 124, a bottom 126, a back 128 and a front wall 130. The sides 120, 122, top 124, bottom 126 and back 128 are closed or continuous to form a substantially sealed or closed container. An aperture is formed in the front wall 130 for insertion of the probe clip cassette 70 therein. Suitable seal means may also be provided, as described hereafter, to sealingly close the opening in the front wall 130.

The case 73 may be formed in any convenient manner, such as being molded in a single piece or formed with separate sides, top, bottom, front and back walls which are joined together by suitable means, such as fasteners, adhesives, etc.

The interior of the case 73 is hollow between the various wall portions thereof. However, various internal divider walls, such as divider walls 132, 134 and 136, are formed in the case 73 and extend perpendicularly away from the bottom wall 126 into the interior of the case 73. The divider walls 132, 134 and 136, in cooperation with opposed inwardly extending portions of the side walls 120 and 122, form a series of spaced, side-by-side disposed slots for receiving the probe clip cassette 70 and individual tissue carrying slides 50 as shown in FIGS. 3 and 4.

Each of the divider walls, such as divider wall 136, is formed with upper and lower, contiguous portions which define an upper receptacle 138 which receives a portion of the probe clip cassette 70 and a lower receptacle 140 which receives an individual tissue slide 50.

The top edge of each of the divider walls 132, 134 and 136 and the top edge of the inwardly extending side wall portions of the side walls 120 and 122 lie in a common plane within the case 73 and form a support which slidably receives the cross leg 72 of the divider walls 84, 86 and 88 and the surfaces 100 and 102 of the side walls 80 and 82 of the probe clip cassette 70. Thus, the base 72 of the probe clip cassette 70 is slidably insertable into the larger recess 142 formed in the front wall 130 of the case 73.

The upper slot or receptacle 138 formed between each opposed pair of the divider walls and the inwardly extending portion of the side walls of the case 73 is formed by a cross leg 144 which extends perpendicular to a straight leg portion 146. The outer portions of the cross leg 144 extend into the recess 138 and define the uppermost limit or edge of the recess 138. As shown in FIG. 3, one extension of the cross leg 144 extends inward a greater distance into one recess 138 than the opposed portion into the adjoining recess 138. This relationship corresponds to the difference in the cross leg portions 94 and 96 in the divider walls of the probe clip cassette 70.

A second pair of opposed, outwardly facing flanges 148 and 150 are formed on the opposite end of the planar leg 146 in each divider wall and define a boundary between the upper receptacle 138 and the lower receptacle 140. Each of the flanges 148 and 150 extends inward into the recess a distance approximately the same as the spaced flanges on the cross leg 144. The flanges 148 and 150 are spaced above a raised base 152 formed above the bottom wall 126 of the case 73. This space defines an opening for slidably receiving and supporting a tissue carrying slide 50, as clearly shown in FIG. 3. The front edge of the base 152 is beveled to guide the slide 50 into the case 73.

Figure 5:
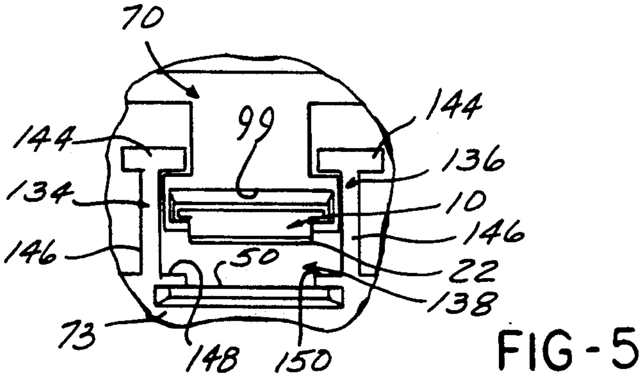
FIG. 5 is a partial, cross sectional view showing the position of a probe clip and a tissue slide in the cassette and housing shown in FIG. 4.

In use, the probe clip cassette 70, as shown in the orientation depicted in FIG. 4, with the base 72 being uppermost, is slidably inserted into the opening in the front wall 130 of the case 73. The base 72 of the probe clip cassette 70 is inserted into the larger aperture 142 in the front wall 130 with the individual probe clips 10 extending downward and being slidably received into the uppermost receptacles 138 in the case 73. This is more clearly shown in FIG. 5 which shows the orientation of a probe clip 10 and a slide 50 in one of the receptacles, such as the receptacle formed between the divider walls 134 and 136. During the insertion of the probe clip cassette 70 into the case 73, the upper portion 14 of each probe clip 10 will extend into the upper receptacle 138 in the case 73 and be spaced from and facing a tissue slide 50 as shown in FIG. 5. The slots 98 formed in each of the divider walls in the probe clip cassette 70 engage opposite sides of the divider wall of the vertical legs 146 of each divider wall of the case 73 so as to maintain the probe clip cassette 70 in a fixed position relative to the case 73.

Clamping means are provided int he case 73 for clamping the probe clip 10 to a slide 50. The clamping means, in the multiple probe clip 10 and slide 50 configuration, shown in FIGS. 3 and 4, acts on the entire probe clip cassette 70 so as to move each individual probe clip 10 in the cassette 70 between a first position spaced from a corresponding tissue slide 50 to a second position in which the seal means 20 on each probe clip 10 sealingly engages the surface of the tissue slide 50 and forms the reaction and mixing chambers 56 and 58 therebetween, as described above.

Figure 7:
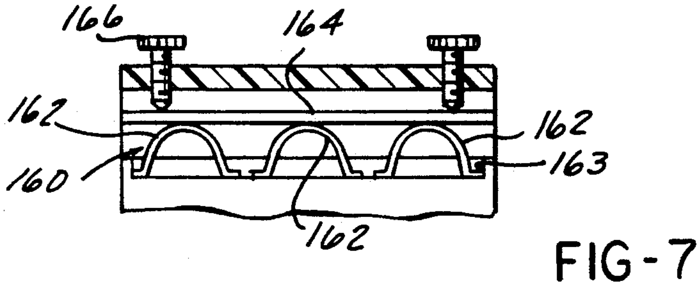
FIG. 7 is a cross sectional view generally taken along line 7—7 in FIG. 3.

Tensioning means 160 in the form of a plurality of outwardly facing springs, such as leaf springs 162, are mounted in a recess in the side wall portions of the case 73 and extend outward from the recess 164 as shown in FIG. 7. The outermost portions of each of the springs 162 engage the tensioning plate support rails 106 on the probe clip cassette 70 and normally bias the probe clip cassette 70 to the first position shown in FIG. 5 in which the probe clips 10 in the cassette 70 are spaced from the corresponding tissue slides 50.

The tensioning plate support rails 106 on the probe clip cassette 70 are slidably inserted by means of the beveled edge 78 on the base 72 between the biasing springs 162 and a tensioning rail 164 mounted interiorly of each side edge of the case 73. Each tensioning rail 164 extends between the front and back walls 130 and 128 of the case 73. Threaded fasteners 166 extend through the upper or top wall 124 of the case 73 and have an enlarged head which may be grasped for advancing or retracting the fasteners 166. When the fasteners 166 are in their uppermost, retracted position, the tensioning rails 164 are spaced from the upper surface of the dividers in the case 73 and provide space for the sliding insertions or removal of the probe clip cassette 70.

With the probe clip cassette 70 inserted into the case 73, the probe clips 10 will be spaced from the associated slides 50 as shown in FIG. 5. Advancing the fasteners 166 toward the case 73 urges the probe clip cassette 70 toward the slides 50 until each probe clip 10 is sealingly joined to an associated slide 50 to form the reaction chamber 56 and the mixing chamber 58 therebetween as described above.

In the second, joined position, the case 73 and probe clip cassette 70 can be rotated through the various steps shown in FIGS. 8A–8F to mix and react the probe with the tissue section and blocking solution as described above. Retraction of the fasteners 166 causes the probe clip cassette 70 to move upward to the first position under the influence of the biasing springs 162 the enable the probe clip cassette 70 to be removed from the case 73.

The in situ assay apparatus of the present invention also includes means for washing the blocking fluid and probe 40 from each tissue section 52 after the probe and blocking fluid have been moved to the reaction chamber 56 for a predetermined period of time, as described above.

Figure 9:
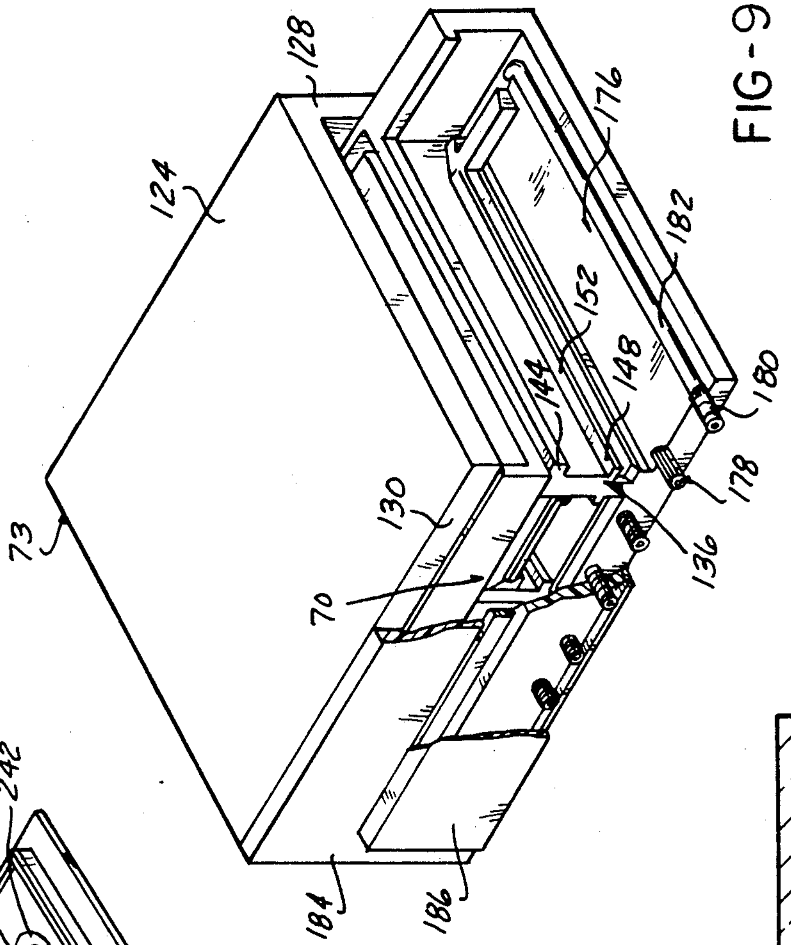
FIG. 9 is a partially broken away, perspective view of the housing of the in situ assay apparatus of the present invention.

The wash means includes an inlet port 178 and an outlet port 180 associated with each receptacle in the case 73, as shown in FIG. 3 and in greater detail in FIG. 9. Each inlet port 178 and outlet port 180 extends through the front wall 130 of the case 73. The inlet port 178 comprises a hollow tube or conduit which opens into the interior of the case 73 in each receptacle. The inlet port 178 is positioned below the slide support members 152 mounted on the base of the case 73. The slide support members 152 extend above the bottom of the case 73 and define a chamber 176 below the slide 50 mounted on the slide support members 152.

The outlet port 180 is connected to a conduit 182 which extends through the case 73 and terminates adjacent the back wall 128. The terminal end of the conduit 182 opens to the interior of the case 73 in the receptacle so as to receive fluid from above and below the slide 50 mounted on the slide receiving members 152. In this manner, all of the fluid within each receptacle may be removed by tilting or disposing the case 73 vertically with the front wall 130 being positioned in a downward facing direction or by applying a vacuum or suction force to the outlet port 180 to draw all the fluid from the receptacle. In this manner, the slide 50 in each individual receptacle in the case 73 may be individually washed so as to remove all traces of unreacted probe from the tissue 52 mounted on the slide 50 without contaminating adjacent samples.

For applications which require the entire case to be submerged in water so as to maintain a constant temperature during hybridization, a frontspiece 184 may be removably mounted over the front wall 130 and the exterior portions of the probe clip cassette 70 as shown in FIG. 9. The frontspiece 184 may be mounted on the case 73 by means of releasable fasteners, not shown, and is sealingly connected to the front wall 130 to form a closed chamber within the case 73. Bores formed in the frontspiece 184 are slidingly mountable over the inlet and outlet ports 178 and 180, respectively, associated with each receptacle in the case 73. A seal cover 186 is removably mounted in a sealable manner over the inlet and outlet ports 178 and 180 so as to close off the inlet and outlet ports 178 and 180.

The use of the in situ assay apparatus of the present invention and the method of employing the apparatus will now be described. Initially, one or more probe clips 10 are prepared with separate probes 40 fixedly attached thereto by freeze-drying, etc. The probe clips 10 are mounted into individual slots in the probe clip cassette 70 with the probe 40 on each clip 10 facing outward from the probe clip cassette 70.

One or more slides 50 containing individual tissue sections or cell groups 52 are slidably inserted into the case 73 in individual receptacles 140 in the case 73. The tissue sections 52 on each slide 50 are positioned so as to be vertically aligned with the first reactant chamber surface 30 on the corresponding probe clip 50 when the probe clip is mounted above the respective slide 50. A predetermined quantity of blocking fluid, such as 200 ul, is applied over the tissue section 52 on each slide 50. This may be a suitable blocking reagent as described above. The probe clip cassette 70 is then inserted into the case 73 and the tensioning fasteners 166 advanced to move the probe clip cassette 70 and each individual probe clip 10 at a second position in which the probe clips 10 are sealingly joined to the respective slides 50 in the case 73.

The case 73 is then incubated for a blocking reaction for a predetermined amount of time. This may be in open air or in a water bath for constant temperature levels.

After blocking, the reagent drop on the tissue section 52 on each slide 50 is moved from the reaction chamber 56 formed between each slide 50 and its corresponding probe clip 10 to the mixing chamber 58. This is done by simply rotating the case 73 from a horizontal to a substantially vertical position and allowing the reactant fluid to move through one or both of the fluid communication channels 26 and 28 formed on the probe clip between the first and second seal members 22 and 24. The fluid fills the mixing chamber 58 and wets and transfers the probe from the probe clip 10 into the fluid. This mixing process may take from five to fifteen seconds depending upon the presence of surfactants and other materials on the probe clip 10 and slide 50. Mixing may be enhanced by a simple back-and-forth hand movement.

With the probe mixed with the reactant, the case 73 is then moved back to a horizontal position which transfers the probe and reactant mixture back to the reaction chamber 56. The probe drop remains coherent during this transfer. When the probe drop is repositioned over the tissue, the case 73 is ready for the second or primary reactant incubation.

After the completion of primary incubation, the tensioning means is released so as to enable the probe clip cassette 70 to move to a first position spacing the individual probe clips 10 from their corresponding slides 50. The probe clip cassette 70 is removed from the case 73 and the individual probe clips 10 disposed of or reconditioned for subsequent use. Washing by the injection of fluid into the inlets 178 in each individual receptacle in the case 73 may take place for a predetermined amount of time to remove all traces of the probe and reactant from the tissue sections 52. The wash fluid is evacuated or drained through the outlet ports 180. The slides 50 may then be removed for subsequent processing or analysis according to conventional techniques.

A second hybridization with a completely different set of probes may also take place after the washing step by inserting new probes into a probe clip cassette 70 and inserting the cassette 70, along with suitable reactants, back into the case 73. Hybridization and/or washing may then take place according to prescribed time periods as substantially described above.

Figure 10:
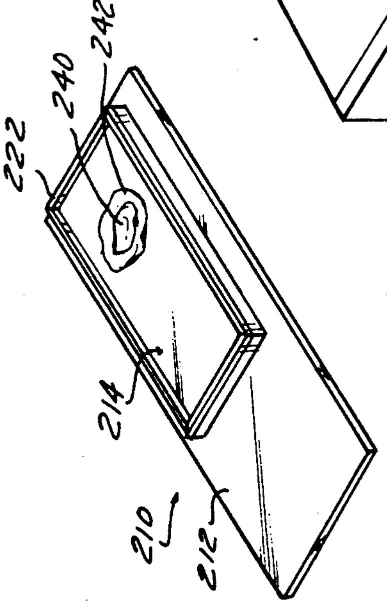
FIG. 10 is a perspective view of another embodiment of the probe clip.
Figure 11:
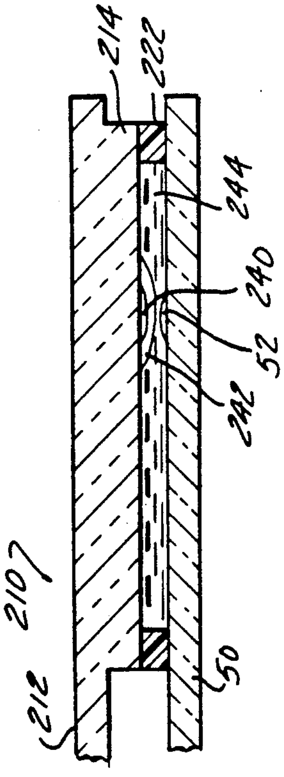
FIG. 11 is a longitudinal, cross sectional view, generally similar to FIG. 6; but showing the combined reaction/mixing chamber formed between the probe clip shown in FIG. 10 and the tissue slide.

In another embodiment, shown in FIGS. 10 and 11, the probe clip 210 includes a generally rectangular, planar base plate 212, identical to the base plate 12 shown in FIG. 1. A raised surface or platform 214 is mounted on the upper surface of the base plate 212. A seal member 222, identical to the seal member 22 shown in FIG. 1 and described above, is mounted on the upper surface and at the peripheral edge of the raised platform 214 to define an internal cavity which acts as a combined mixing/reaction chamber when the probe clip 210 is joined to a slide 50.

In this embodiment, the probe 240 is mounted on the upper surface of the platform 214 as with the first embodiment. However, a coating 242 of a time-release material, such as gelatin, is disposed over and completely covers the probe 240. The time-release material is one which hydrolyzes when contacted with a fluid, such as the reactant fluid disposed on the tissue on the slide 50. The time required for such hydrolysis is dependent upon the type of time-release material selected as well as its thickness. The thickness, for example, can be varied to provide times ranging from one hour, two hour, etc. This time is critical to enable the reactant fluid applied to the tissue 52 on the slide 50 to initially block the tissue. At the same time, the reactant fluid which completely fills the reaction chamber when the probe clip 210 is sealingly joined to the slide 50, as shown in FIG. 11, acts to hydrolyze the material coating 242 covering the probe 240.

After the predetermined time has expired, the material coating will be at least partially hydrolyzed so as to enable the reactant fluid to contact, wet and release the probe 240 from the plate 212. The probe 240 then contacts and reacts with the tissue section 52 on the slide 50, as described above, to bind and mark message RNA or proteins in the tissue section 50 for subsequent analysis or evaluation.

Subsequent separation of the probe clip 210 from the slide 50 and washing of unbound or non-specifically bound probe from the tissue 52 can take place as described above. It should be noted that no rocking or horizontal/vertical rotation of this embodiment is required to provide mixing and reaction of the probe with the tissue section 50. This embodiment lends itself to automated in situ assay techniques.

In summary, there has been disclosed a unique probe clip and in situ assay apparatus and method which simplifies the in situ assay of tissue sections. The probe clip is inexpensively constructed and includes one or two chambers for mixing and reacting various components. The probe clip is sealingly attached to a slide carrying a tissue section to form a mixing chamber and a reaction chamber. Rotation of the joined probe clip and slide, in the two chamber embodiment, causes reactant initially disposed in the reaction chamber over the tissue section to flow and mix with the probe in the mixing chamber. Subsequent rotation of the probe clip and slide moves the reagent and probe back to the reaction chamber for reaction with the tissue section.

The probe clip is removably insertable into a probe clip cassette which itself is insertable into a housing. This provides multiple specimen analysis at the same time. Constant temperature and thorough washing of the tissue sections is also uniquely provided by the probe clip and in situ assay apparatus of the present invention.

What is claimed is:

1. A reaction chamber apparatus for in situ assay of a tissue section mounted on a slide, the reaction chamber apparatus comprising:

a planar slide having a tissue section mounted thereon;

a planar plate formed of a plastic material;

a material layer mounted on one end of the plate to form a raised surface on one major side of the plate, the material layer being integral with the plate;

a first seal member mounted on the material layer and having a closed periphery formed of opposed pairs of side walls defining an interior cavity on the material layer between the opposed pairs of the side walls of the first seal member;

a second seal member mounted on the material layer intermediate one pair of side walls of the material layer, the second seal member having first and second ends, the first and second ends of the second seal member being spaced from another pair of opposed side walls of the first seal member to form first and second free gravity fluid flow communicating channels each providing flow communication between first and second surfaces on the material layer, the first and second surfaces being located between the sides of the second seal member and the one pair of opposed side walls of the first seal member; and a probe formed of a dried, soluble reagent material mounted on the second surface of the material layer;

the first and second seal members sealing contacting the slide when the slide brought into proximity with the material layer to form a sealed reaction chamber between the portion of the slide having the tissue section mounted thereon and the first surface of the material layer, a liquid reactant disposed in the reaction chamber, and a sealed mixing chamber between a remaining portion of the slide and the second surface of the material layer, the reaction chamber and the mixing chamber being disposed in bi-directional fluid flow communication by the first and second fluid flow channels for transfer of the liquid reactant to the mixing chamber to release the probe from the second surface of the material layer and for transfer of the released probe to the reaction chamber for reaction with the tissue section through the first and second fluid flow channels upon bi-directional, end-to-end rotation of the sealingly connectrd slide and plate.

2. A reaction chamber apparatus for in situ assay of a tissue section or group of cells, the reaction chamber apparatus comprising:

a slide having a tissue section mounted on one portion thereon;

a planar plate;

a first seal member mounted on the plate and having a closed periphery formed of opposed wall portions defining an interior cavity therebetween on the plate;

a second seal member mounted on the plate within the periphery of the opposed wall portions of the first seal member for dividing the interior cavity into first and second fluid flow communicating surfaces located between the sides of the second seal member and certain opposed wall portions of the first seal member, the second seal member being spaced from opposed wall portions of the first seal member to form first and second free gravity fluid flow passages between the spaced portions of the first and second seal members each providing flow communication between the first and second surface on the plate; and a probe formed of a dried, soluble reagent material releasably mounted on the second surface of the plate;

the first and second seal members sealingly contacting the slide when the plate us brought into proximity with the slide to form a sealed reaction chamber between the one portion of the slide having the tissue section mounted thereon and the opposed first surface of the plate, a liquid reactant disposed in the reaction chamber, and a sealed mixing chamber between a remaining portion of the slide and the second surface of the plate, the reaction chamber and the mixing chamber being disposed in bi-directional fluid flow communication by the first and second fluid flow passages for free gravity flow of the reactant from the reaction chamber to the mixing chamber to release the probe from the second surface of the plate and for free gravity flow of the released probe to the reaction chamber for reaction with the tissue section through the first and second fluid flow passages upon bi-directional, end-to-end rotation of the sealing connected slide and plate.

3. The reaction chamber apparatus of claim 2 wherein the plate has a rectangular shape.

4. The reaction chamber apparatus of claim 2 wherein:

the plate is formed of a siliconized plastic material.

5. The reaction chamber apparatus of claim 2 wherein:

the seal member has a rectangular shape formed of contiguous, opposed, spaced pairs of side walls.

6. The reaction chamber apparatus of claim 2 further including:

a material layer mounted on one end of the plate to form a raised surface on the plate;

the first and second seal members and the probe disposed on an exposed surface of the material layer.

7. The reaction chamber apparatus of claim 6 wherein the material layer is integral with the plate.

* * * * *